United States Patent [19]
Rein et al.

[11] 4,134,965
[45] Jan. 16, 1979

[54] CAUSTIC WASHED MOLECULAR SIEVES

[75] Inventors: Alan J. Rein, Bridgewater; David D. Saperstein, Mountainside; Seemon H. Pines, Murray Hill, all of N.J.

[73] Assignee: Merck & Co., Inc., Rahway, N.J.

[21] Appl. No.: 829,327

[22] Filed: Aug. 31, 1977

[51] Int. Cl.$^2$ .............................................. C01B 33/28
[52] U.S. Cl. .................................. 423/328; 252/455 Z
[58] Field of Search ..................... 423/328, 329, 330; 252/455 Z

[56] References Cited

U.S. PATENT DOCUMENTS

| | | | |
|---|---|---|---|
| 2,882,243 | 4/1959 | Milton | 423/328 |
| 3,374,182 | 3/1968 | Young | 423/328 X |
| 3,483,137 | 12/1969 | Sensel | 423/328 X |

Primary Examiner—Edward J. Meros
Attorney, Agent, or Firm—Hesna J. Pfeiffer; Julian S. Levitt

[57] ABSTRACT

A novel improved molecular sieve is prepared by a caustic wash process. The sieves so prepared show improved properties in reactions involving e.g., superior acid scavenging ability.

1 Claim, No Drawings

CAUSTIC WASHED MOLECULAR SIEVES

This invention relates to a novel product, caustic-washed molecular sieves, and to the caustic wash process to prepare them.

The molecular sieves which are used in this process are alumino-silicate zeolites. Generally speaking, naturally-occurring zeolites can be defined as a group of crystalline solids, hydrated alumino-silicates of mono- and divalent bases, which are capable of losing part or all of their water without change of lattice framework, adsorbing other compounds in place of the water removed, and which are capable of undergoing base exchange. A synthetic zeolite, on the other hand, is synthesized from a combination of basic oxides ($AlO_2$, $SiO_2$, $Na_2O$, $K_2O$, etc.) in an aqueous system to yield a hydrated or semi-hydrated crystalline structure. Following heat treatment, the zeolites are characterized and classified primarily by X-ray powder diffraction methods. Although there is lack of a systematic chemical method for naming synthetic, complex alumino-silicates, historically each new synthetic zeolite is assigned an arbitrary letter or group of letters and numbers. The meaning of these arbitrary symbols is well understood by those skilled in the art.

It has been found that synthetic zeolites of the A class can be improved by a caustic wash process of this invention. This class has a pore size in the range of from about 3 to about 5 Å.

A-type molecular sieves are readily commercially available, and have a regular crystal structure and uniform pore size. The most commonly available sieves, Types 3A and 4A, are all operable in the invention. These sieves have the following properties:

| Type | Formula | Pore Diameter |
|---|---|---|
| 3A | $K_xNa_{12-x}[(AlO_2)_{12}(SiO_2)_{12}] \cdot 27H_2O$ | 3Å |
| 4A | $Na_{12}[(AlO_2)_{12}(SiO_2)_{12}] \cdot 27H_2O$ | 4Å |

The caustic wash process involves the following procedure: the molecular sieves are slurried with a large volume of appropriate dilute caustic, such as aqueous 0.10–0.5N sodium hydroxide for the 4Å sieve and potassium hydroxide for the 3Å sieve. The mixture is heated for from 15 minutes to 1 hour at 70°–100° C. while stirring with water until the pH of the wash water is between 10–11. The filter cake is broken up, and dried at a sufficient temperature and time to reduce ignition loss (as determined using standard procedures) to between 2–8%.

The caustic washed sieves so produced have improved properties in terms of yield and kinetics, when used in various chemical processes, such as those described in Weinstock, South Africa Pat. No. 74/7635, issued Nov. 3, 1976, and Weinstock et al., *Tet. Letters*, "The Chemistry of Cephamycins, IV, Acylation of Amides in the Presence of Neutral Acid Scavengers."

One illustrative preparation of the caustic washed sieves is as follows:

Experimental Method for Caustic Washing Sieves

1. Weigh 10 gms. of molecular sieves, Linde type 4A, into a 500 ml. Erlenmeyer flask.
2. Add 200 ml. of 0.18N sodium hydroxide to the flask.
3. Heat slurry to 70°–100° C. for ¼ hour while stirring (magnetic stirrer).
4. Filter hot slurry rapidly through medium sintered glass funnel.
5. Wash filter cake repeatedly with cold water, until wash solution is pH 10–11. Do not overwash.
6. Suck the filter cake completely dry.
7. Break up filter cake thoroughly. Place wet sieves in porcelain crucible.
8. Place crucible in a 300° C. preheated muffle furnace. Dry for 2 hours.
9. Cool crucible in dessicator using dry sieves (< 3% $H_2O$) as dessicant.
10. Obtain loss on ignition (L.O.I.) on cooled sieves. Value should be 2–8%. If necessary, adjust drying times or temperature to obtain this range.
11. Store sieves in tightly capped bottle.

The effect of caustic washing is to remove surface contaminants through dissolution which can be observed in scanning electron micrographs.

The caustic-washed sieves so prepared can be used to prepare e.g., sodium 7-(2-thienylacetamido)-7-methoxy-3-carbamoyloxymethyl-3-cephem-4-carboxylate. One illustrative procedure is as follows:

A mixture of 2.76 g. (4 mmoles) of the dimethoxymethyl ester of 7β-(D-5-tosylamino-5-carboxyvaleramido)-3-carbamoyloxymethyl-7α-methoxy-3-cephem-4-carboxylate, 3 g. of dry Linde-type 4A molecular sieves, having 2–8% water, 2 ml. of thienylacetyl chloride (16 mmoles) in 34 ml. of dichloroethane is stirred at reflux for 5 hours t-Butanol, 0.38 ml. (4 mmoles) is then added and stirring continued for 2 hours. At the end of this period, another 0.095 ml. (1 mmole) of t-butanol is introduced and the reaction mixture was stirred for another ½ hour. The reaction mixture is cooled to 0°–5° C. in an ice-water bath. The molecular sieves are removed by suction-filtration and then washed with 40 ml. of ice-cold methanol. The filtrate and wash were combined and cooled to 0° C. An ice-cold solution of 8.3 ml. concentrated HCl and 9.5 ml. MeOH is added and the solution warmed to 15° C. and stirred at 15° C. for 2 hrs. 40 min. When the hydrolysis is complete the reaction is quenched by adding to a suspension of 22 g. sodium bicarbonate in 120 ml. of water at 0°–5° C. The two-phase solution is stirred for 10 min. The heavy salt deposit that forms is removed by filtration and washed with a small amount of 5% NaCl solution containing 0.5% sodium bicarbonate. The dichloroethane layer is separated and extracted with 2 × 20 ml. of a solution of 0.5% $NaHCO_3$ + 5% NaCl. The aqueous fractions are combined and washed with 20 ml. of dichloroethane. The bicarbonate solution was assayed by liquid chromatography to contain 73% sodium 7-(2-thienylacetamido)-7-methoxy-3-carbamoyloxymethyl-3-cephem-4-carboxylate and 2.1% of the unchanged starting material.

Following this or a similar procedure, caustic-washed and unwashed sieves were evaluated. The unwashed sieves yielded about 65% total product after about 2½ hours reaction time, after which this yield decreased rapidly. By contrast, the washed sieves yielded 70% total product at 3 hours reaction time, and 75% at 4 hours, all yields measured by liquid chromatography methods.

What is claimed is:

1. The process for preparing caustic washed molecular sieves of type 3A or 4A of improved acid scavenging ability, which comprises slurrying the sieves with the appropriate aqueous 0.10–0.5N caustic solution, heating for ¼–1 hour at 70°–100° C., filtering, washing until the pH of the wash water is 10–11 and drying to a loss on ignition value of between 2–8%.

* * * * *